US012722512B2

(12) United States Patent
Aoki et al.

(10) Patent No.: US 12,722,512 B2
(45) Date of Patent: Sep. 1, 2026

(54) SERVER DEVICE

(71) Applicant: TOYOTA JIDOSHA KABUSHIKI KAISHA, Toyota (JP)

(72) Inventors: Takahiro Aoki, Saitama (JP); Yuta Takata, Toyota (JP); Haruki Oguri, Toyota (JP); Takashi Yamazaki, Nagoya (JP); Tsuyoshi Okada, Nagoya (JP); Hiroki Asao, Kobe (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 123 days.

(21) Appl. No.: 18/413,213

(22) Filed: Jan. 16, 2024

(65) Prior Publication Data

US 2024/0294083 A1 Sep. 5, 2024

(30) Foreign Application Priority Data

Mar. 2, 2023 (JP) ................................ 2023-032244

(51) Int. Cl.
*B60L 53/35* (2019.01)
*B60L 53/57* (2019.01)
*B60L 53/67* (2019.01)
*B60L 53/68* (2019.01)

(52) U.S. Cl.
CPC ............... *B60L 53/35* (2019.02); *B60L 53/57* (2019.02); *B60L 53/67* (2019.02); *B60L 53/68* (2019.02); *B60L 2240/68* (2013.01)

(58) Field of Classification Search
CPC .......... B60L 53/35; B60L 53/57; B60L 53/67; B60L 53/68; B60L 2240/68
See application file for complete search history.

(56) References Cited

U.S. PATENT DOCUMENTS

| | | | | |
|---|---|---|---|---|
| 10,124,688 B2 * | 11/2018 | Delp | ................. | G01C 21/3415 |
| 10,802,490 B2 * | 10/2020 | Harris | ................ | G06Q 30/0265 |
| 11,780,469 B1 * | 10/2023 | Roy | ........................ | B60L 53/14 701/22 |
| 12,202,364 B2 * | 1/2025 | Lei | .......................... | B60L 53/36 |
| 12,311,977 B2 * | 5/2025 | Roy | ...................... | B60L 53/665 |
| 2018/0107219 A1 * | 4/2018 | Harris | .................... | G08G 1/202 |
| 2018/0257498 A1 * | 9/2018 | Delp | ................. | G01C 21/3469 |
| 2019/0009756 A1 * | 1/2019 | Jacobs | .................... | B60L 53/80 |
| 2020/0317067 A1 * | 10/2020 | Miller | ................... | B60L 53/126 |
| 2020/0317074 A1 * | 10/2020 | Miller | ..................... | B60L 53/36 |
| 2020/0317077 A1 * | 10/2020 | Schaffer | ................. | B60L 53/64 |

(Continued)

FOREIGN PATENT DOCUMENTS

JP 2019-093968 A 6/2019

*Primary Examiner* — Peter D Nolan
(74) *Attorney, Agent, or Firm* — SoraIP, Inc.

(57) ABSTRACT

The server device includes a communication unit and a control unit that performs communication using the communication unit. The control unit sends a movement instruction to the first power supply vehicle to the position of the power supply vehicle when the traffic situation around the power supply vehicle that requires power supply is a first situation. When the traffic situation is a second situation where the degree of congestion is higher than the first situation, the control unit causes a second power supply vehicle having a higher power generation capacity than the first power supply vehicle to move to the position of the power supplied vehicle. Send movement instructions.

13 Claims, 2 Drawing Sheets

(56) References Cited

U.S. PATENT DOCUMENTS

| | | | | |
|---|---|---|---|---|
| 2021/0241626 | A1* | 8/2021 | Nishimura | G06Q 10/02 |
| 2021/0284128 | A1* | 9/2021 | Nishida | B60W 20/20 |
| 2021/0300202 | A1* | 9/2021 | Ogawa | B60L 53/63 |
| 2023/0311688 | A1* | 10/2023 | Perumalla | B60L 53/57<br>320/109 |
| 2023/0415784 | A1* | 12/2023 | Roy | B60L 53/57 |
| 2024/0221103 | A1* | 7/2024 | Ward | G06Q 50/40 |
| 2025/0050777 | A1* | 2/2025 | Calabro | B60L 53/64 |

* cited by examiner

10
SERVER DEVICE
COMMUNICATION UNIT
101
STORAGE UNIT
102
CONTROL UNIT
103
13
POWER SUPPLY VEHICLE
IN-VEHICLE DEVICE
14
BATTERY
15
AN ELECTRIC POWER GENERATING DEVICE, COMPRISING:
17
11
12
POWER SUPPLY SUBJECT VEHICLE
14
IN-VEHICLE DEVICE
COMMUNICATION UNIT
121
STORAGE UNIT
122
CONTROL UNIT
123
POSITIONING UNIT
124
INPUT UNIT
125
OUTPUT UNIT
126
DETECTION UNIT
127
BATTERY
15
1

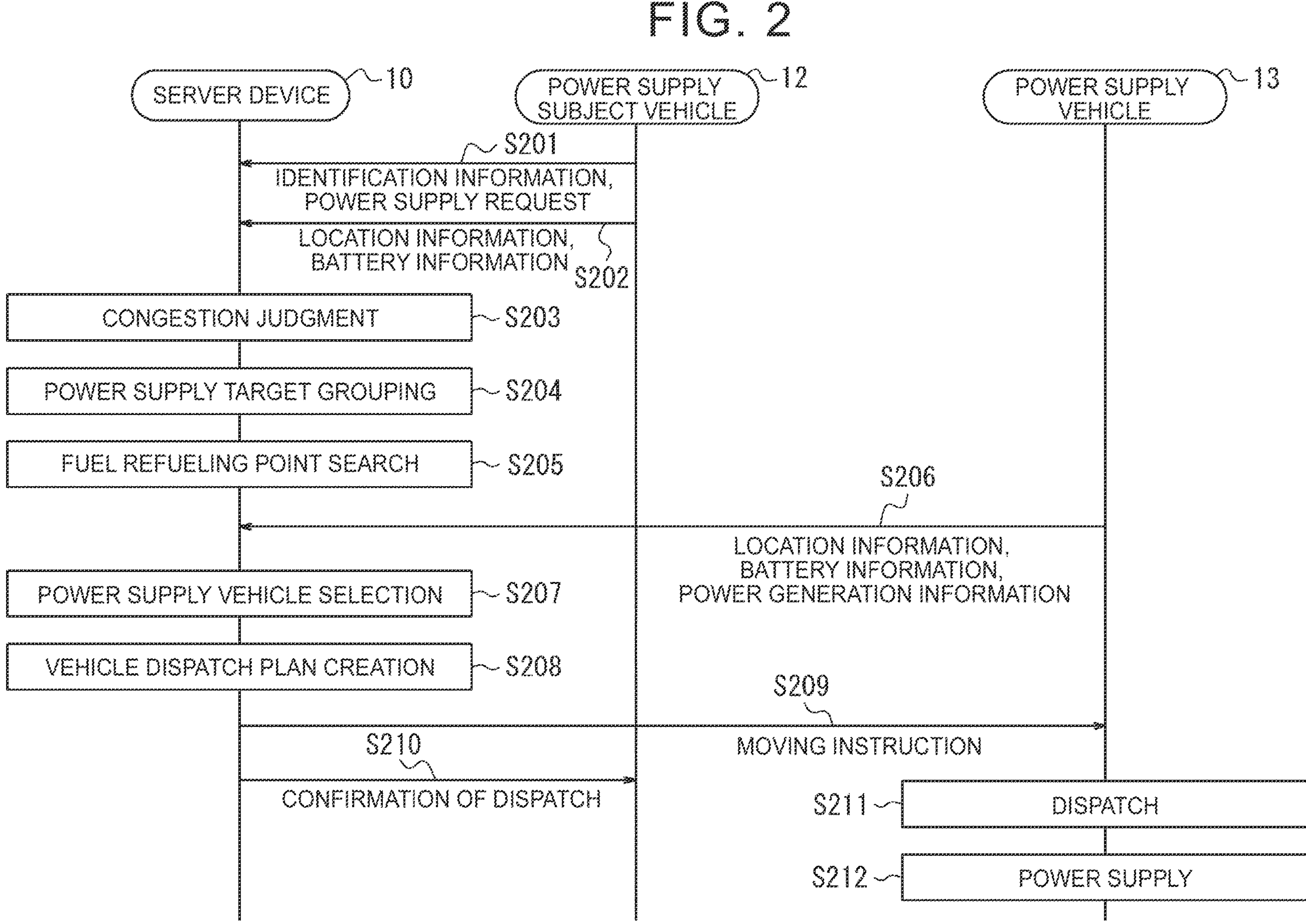
FIG. 2
SERVER DEVICE
10
POWER SUPPLY SUBJECT VEHICLE
12
POWER SUPPLY VEHICLE
13
S201
IDENTIFICATION INFORMATION, POWER SUPPLY REQUEST
LOCATION INFORMATION, BATTERY INFORMATION
S202
CONGESTION JUDGMENT
S203
POWER SUPPLY TARGET GROUPING
S204
FUEL REFUELING POINT SEARCH
S205
S206
LOCATION INFORMATION, BATTERY INFORMATION, POWER GENERATION INFORMATION
POWER SUPPLY VEHICLE SELECTION
S207
VEHICLE DISPATCH PLAN CREATION
S208
S209
MOVING INSTRUCTION
S210
CONFIRMATION OF DISPATCH
S211
DISPATCH
S212
POWER SUPPLY

SERVER DEVICE

CROSS-REFERENCE TO RELATED APPLICATION

This application claims priority to Japanese Patent Application No. 2023-032244 filed on Mar. 2, 2023, incorporated herein by reference in its entirety.

BACKGROUND

1. Technical Field

The present disclosure relates to a server device.

2. Description of Related Art

A battery electric vehicle (Electric Vehicle or EV) etc. driven by a battery occasionally runs out of power during travel. Various techniques have been proposed to resolve or avoid such a situation. For example, Japanese Unexamined Patent Application Publication No. 2019-093968 (JP 2019-093968 A) discloses a technique of charging a vehicle running out of power from another vehicle.

SUMMARY

There is room to improve reliability so that a necessary amount of power can be supplied more reliably when a power supply vehicle supplies power to a vehicle running out of power.

The present disclosure provides a server device etc. that makes it possible to improve the reliability of power supply by a power supply vehicle.

An aspect of the present disclosure provides a server device including: a communication unit; and a control unit that performs communication using the communication unit, in which: the control unit sends a first power supply vehicle a movement instruction to move to a position of a power supply subject vehicle that requires power supply when a traffic situation around the power supply subject vehicle is a first situation; and the control unit sends a second power supply vehicle with a higher power generation capacity than the first power supply vehicle a movement instruction to move to the position of the power supply subject vehicle when the traffic situation is a second situation in which a degree of congestion is higher than the first situation.

With the server device etc. according to the present disclosure, it is possible to improve the reliability of power supply by a power supply vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a diagram illustrating an example of the operation procedure of the server device, the power supply subject vehicle, and the power supply vehicle.

DETAILED DESCRIPTION OF EMBODIMENTS

Figure 1:
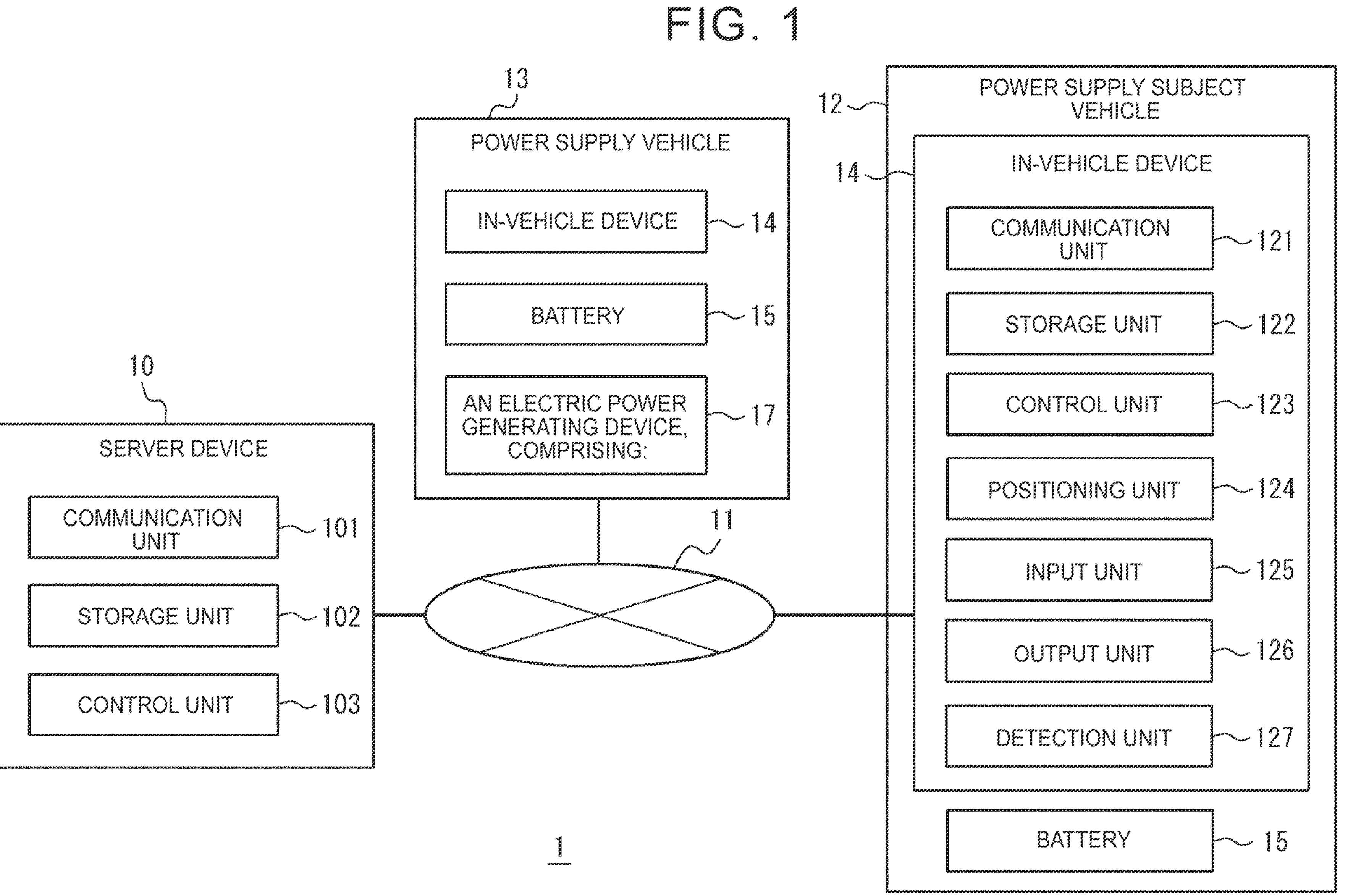
FIG. 1 is a diagram showing an example of the configuration of a vehicle management system.

Embodiments will be described below with reference to the drawings.

FIG. 1 is a diagram showing a configuration example of a vehicle management system in one embodiment. The vehicle management system 1 includes one or more server devices 10, one or more power supply subject vehicles 12, and one or more power supply vehicles 13, which are connected to each other so as to be able to communicate information via a network 11.

The server device 10 is, for example, a server computer belonging to a cloud computing system or other computing systems and functioning as a server implemented with various functions.

The power supply subject vehicle 12 is a passenger car or a commercial vehicle equipped with a communication function and an information processing function, and is connected to the network 11 via a mobile communication network. The power supply subject vehicle 12 is, for example, a Battery Electric Vehicle (BEV), a Hybrid Electric Vehicle (HEV), a Plug-in Hybrid Electric Vehicle (PHEV), or the like, which is driven by electric power from a mounted battery 15. In this embodiment, when the battery 15 needs to be charged, the power supply subject vehicle 12 receives power at a power supply station or receives power from the power supply vehicle 13. The power supply subject vehicle 12 may be driven by a driver, or may be driven to any level of automation.

The power supply vehicle 13 is a passenger car or a commercial vehicle equipped with a communication function and an information processing function, and is connected to the network 11 via a mobile communication network. The power supply vehicle 13 has an in-vehicle device 14 and a battery 15 that are the same as those of the power supply subject vehicle 12, and the battery 15 in the power supply vehicle 13 includes a battery that stores power for supplying power to the power supply subject vehicle 12. The power supply vehicle 13 is a BEV, HEV, PHEV, or the like that is driven by electric power from a mounted battery 15, but may also be a fuel cell electric vehicle (FCEV) or a gasoline vehicle. Moreover, the power supply vehicle 13 has a power generation device 17 as appropriate. The power supply vehicle 13 may be driven by a driver, or may be driven at any level of automation.

Network 11 is, for example, the Internet, but also includes ad hoc networks, LANs, Metropolitan Area Networks (MANs), and/or other networks.

In the present embodiment, the vehicle management system 1 is a system for supporting the power supply vehicle 13 to charge the power supply subject vehicle 12 when the power supply subject vehicle 12 runs into a power shortage. The power shortage includes a state in which the remaining battery power has decreased to such an extent that the power supply subject vehicle 12 cannot perform one or more functions including driving, or a state in which the remaining battery power has fallen below an arbitrary remaining power level, but the power supply subject vehicle 12 It may be in a state where the user arbitrarily determines that power supply is necessary. Rush charging is a mode in which power is supplied by moving the power supply vehicle 13 to the location of the power supply subject vehicle 12 and charging the battery 15 of the power supply subject vehicle 12 from the battery 15 of the power supply vehicle 13 or the power generation device 17. In the vehicle management system 1, the server device 10 performs rush charging by sending a movement instruction to the power supply vehicle 13 to supply power to each of the one or more power supply vehicles 12.

The server device 10 includes a communication unit 101 and a control unit 103 that performs communication using the communication unit 101. When the traffic situation around the power supply subject vehicle 12 that requires power feeding is in the first situation, the control unit 103 causes the first power supply vehicle 13 to receive a second situation in which the traffic situation is higher in congestion than the first situation. At this time, an instruction to move to the position of the power supply subject vehicle 12 is sent to the second power supply vehicle 13 which has a higher power generating capacity than the first power supply vehicle 13. In a traffic situation such as a traffic jam with a high degree of congestion, there is a high probability that a plurality of power supply subject vehicles 12 will be stranded due to lack of power, and a large amount of power supply will be required. In such a case, even if an attempt is made to perform rush charging using the power supply vehicle 13 equipped with only the battery 15, there is a possibility that the remaining battery power of the power supply vehicle 13 will not cover the necessary power supply amount. Even in such a case, according to the present embodiment, in the case of traffic congestion, by providing the power generation device 17 in addition to the battery 15, it is possible to drive the power supply vehicle 13, which has a higher power generation capacity than when only the battery 15 is used. By performing additional charging, it is possible to more reliably supply the necessary amount of power. Therefore, it is possible to improve the reliability of power supply by the power supply vehicle.

Next, a configuration example of the server device 10, the power supply subject vehicle 12, and the power supply vehicle 13 will be described.

The server device 10 includes a communication unit 101, a storage unit 102, and a control unit 103. The server device 10 may be one computer, or may be composed of two or more computers that are connected to enable information communication and operate in coordination. When the server device 10 is composed of two or more computers, the configuration shown in FIG. 1 is appropriately arranged on the two or more computers.

Communication unit 101 includes one or more communication interfaces. The communication interface is, for example, a LAN interface. The communication unit 101 receives information used for the operation of the control unit 103 and transmits information obtained by the operation of the control unit 103. The server device 10 is connected to the network 11 by the communication unit 101 and performs information communication with the power supply subject vehicle 12 and the power supply vehicle 13 via the network 11.

The storage unit 102 includes, for example, one or more semiconductor memories, one or more magnetic memories, one or more optical memories, or a combination of at least two of these, which function as a main storage device, an auxiliary storage device, or a cache memory. The semiconductor memory is, for example, Random Access Memory (RAM) or Read Only Memory (ROM). The RAM is, for example, Static RAM (SRAM) or Dynamic RAM (DRAM). The ROM is, for example, an Electrically Erasable Programmable ROM (EEPROM). The storage unit 102 stores information used for the operation of the control unit 103 and information obtained by the operation of the control unit 103.

Control unit 103 includes one or more processors, one or more dedicated circuits, or a combination thereof. The processor is, for example, a general-purpose processor such as a Central Processing Unit (CPU), or a dedicated processor such as a Graphics Processing Unit (GPU) specialized for specific processing. The dedicated circuit is, for example, a Field-Programmable Gate Array (FPGA), an Application Specific Integrated Circuit (ASIC), or the like. The control unit 103 executes information processing related to the operation of the server device 10 while controlling each part of the server device 10.

The functions of the server device 10 are realized by executing a control program by a processor included in the control unit 103. The control program is a program that causes the computer to execute the processing of steps included in the operation of the server device 10, thereby causing the computer to realize functions corresponding to the processing of the steps. That is, the control program is a program for causing the computer to function as the server device 10. Furthermore, some or all of the functions of the server device 10 may be realized by a dedicated circuit included in the control unit 103. Further, the control program may be stored in a non-transitory recording/storage medium that can be read by the server device 10, and the server device 10 may read the control program from the medium.

Power supply subject vehicle 12 includes an in-vehicle device 14 and a battery 15. The in-vehicle device 14 includes a communication unit 121, a storage unit 122, a control unit 123, a positioning unit 124, an input unit 125, an output unit 126, and a detection unit 127. One or more of these parts may be configured as one control device, or may be configured as a terminal device such as a smartphone or a tablet terminal, a navigation device, or the like. Alternatively, each part may be connected to enable information communication via an in-vehicle network compliant with standards such as Controller Area Network (CAN). The battery 15 is, for example, one or more lithium ion batteries that charge and discharge electric power for driving the power supply subject vehicle 12.

The communication unit 121 includes one or more communication interfaces. The communication interface is, for example, an interface compatible with mobile communication standards such as Long Term Evolution (LTE), 4th Generation (4G), or 5th Generation (5G). The communication unit 121 receives information used for the operation of the control unit 123 and transmits information obtained by the operation of the control unit 123. The control unit 123 is connected to the network 11 via a mobile communication base station by the communication unit 121, and performs information communication with the server device 10 and the like via the network 11.

The storage unit 122 includes one or more semiconductor memories, one or more magnetic memories, one or more optical memories, or a combination of at least two of these. The semiconductor memory is, for example, a RAM or a ROM. The RAM is, for example, a static random access memory (SRAM) or a dynamic random access memory (DRAM). The ROM is, for example, an EEPROM. The storage unit 122 functions as, for example, a main storage device, an auxiliary storage device, or a cache memory. The storage unit 122 stores information used for the operation of the control unit 123 and information obtained by the operation of the control unit 123.

Control unit 123 includes one or more processors, one or more dedicated circuits, or a combination thereof. The processor is a general-purpose processor such as a CPU or a dedicated processor specialized for specific processing. The dedicated circuit is, for example, an FPGA or an ASIC. The control unit 123 executes information processing related to the operation of the power supply subject vehicle 12 while controlling each unit of the in-vehicle device 14.

The positioning unit 124 includes one or more Global Navigation Satellite System (GNSS) receivers. GNSS includes, for example, at least one of Global Positioning System (GPS), Quasi-Zenith Satellite System (QZSS), BeiDou, Global Navigation Satellite System (GLONASS), and Galileo. The positioning unit 124 sends the positioning result to the control unit 123, and the control unit 123 determines the position information of the power supply subject vehicle 12.

The input unit 125 includes one or more input interfaces. The input interface is, for example, a physical key, a capacitive key, a pointing device, a touch screen integrated with a display, or a microphone that receives voice input. The input interface may further include a camera that captures images or image codes, or an IC card reader. The input unit 125 accepts an operation to input information used for the operation of the control unit 123 and sends the input information to the control unit 123.

The output unit 126 includes one or more output interfaces. The output interface is, for example, a display or a speaker. The display is, for example, a Liquid Crystal Display (LCD) or an organic Electro-Luminescence (EL) display. The output unit 126 outputs information obtained by the operation of the control unit 123.

The detection unit 127 has an interface with one or more sensors that detects the state of each part of the power supply subject vehicle 12, or one or more sensors. The sensors include, for example, a sensor that detects the remaining battery level of the battery 15, a sensor that detects the motion state (speed, longitudinal acceleration, lateral acceleration, deceleration, etc.) of the power supply subject vehicle 12, and the like. The detection unit 127 sends information indicating each state detected by the sensor to the control unit 123.

The functions of the control unit 123 are realized by executing a control program with a processor included in the control unit 123. The control program is a program that causes the computer to execute the processing of the steps included in the operation of the control unit 123, thereby causing the computer to realize a function corresponding to the processing of the steps. That is, the control program is a program for causing the computer to function as the control unit 123. Further, some or all of the functions of the control unit 123 may be realized by a dedicated circuit included in the control unit 123.

The power supply vehicle 13 has an in-vehicle device 14 equivalent to the power supply subject vehicle 12, and the above description of the in-vehicle device 14 of the power supply subject vehicle 12 applies. Battery 15 of power supply vehicle 13 includes a battery that charges and discharges power to be supplied to power supply subject vehicle 12. Moreover, the power supply vehicle 13 has a power generation device 17 as appropriate. The power generation device 17 includes a fuel cell, a gasoline power generation device, etc. that generate power using any fuel including hydrogen.

FIG. 2 is a sequence diagram illustrating an example of a procedure for the cooperative operation of the server device 10, the power supply subject vehicle 12, and the power supply vehicle 13. Steps related to various information processing of the server device 10, the power supply subject vehicle 12, and the power supply vehicle 13 in FIG. 2 are executed by the respective control units 103, 123, and 123. In addition, the steps related to the transmission and reception of various information between the server device 10, the power supply subject vehicle 12, and the power supply vehicle 13 are executed by the control units 103, 123, and 123 transmitting and receiving information to and from each other via the communication units 101, 121, and 121, respectively. In the server device 10, the power supply subject vehicle 12, and the power supply vehicle 13, the control units 103, 123, and 123 appropriately store information to be processed, transmitted, and received in the storage units 102, 122, and 122, respectively.

The procedure in FIG. 2 is an example of a procedure when the server device 10 allocates the power supply vehicle 13 for rushing the power supply subject vehicle 12 for charging.

In S201, the power supply subject vehicle 12 sends identification information and a power supply request to the server device 10. The power supply subject vehicle 12 performs identification when the remaining battery level falls below an arbitrary standard and there is a power shortage, or when the user determines that power supply is necessary and inputs an instruction to send a power supply request into the in-vehicle device 14. The information and power supply request are sent to the server device 10. The criterion for determining power shortage is, for example, a State of Charge (SOC) value of 20% or less. The identification information is information that identifies the power supply subject vehicle 12. S201 is executed for each of one or more power supply subject vehicles 12.

In S202, the server device 10 acquires location information and battery information from the power supply subject vehicle 12 that sent the power supply request. The server device 10 requests information for each power supply subject vehicle 12 from one or more power supply subject vehicles 12, and acquires information sent from each power supply subject vehicle 12 in response to the request. The battery information includes information such as the capacity and remaining amount of the battery 15.

In S203, the server device 10 determines whether the traffic situation around the power supply subject vehicle 12 is congested. For example, the server device 10 acquires road traffic information for each power supply subject vehicle 12 that has sent a power-supply request. Then, the server device 10 determines whether a traffic jam is occurring at each location based on the road traffic information. In addition, the server device 10 executes S202 at an arbitrary period, for example, at a period of several seconds to more than ten seconds, and derives the moving speed from the amount of change in position over time for each power supply subject vehicle 12, and calculates the moving speed at an arbitrary time or an arbitrary distance. If the moving speed is below an arbitrary standard, for example, if the moving speed is 10 km/h or less for 10 minutes or more or 1 km or more, it may be determined that a traffic jam has occurred. Furthermore, the server device 10 derives the distance between the nearest power supply subject vehicles 12 from the positions of the plurality of power supply subject vehicles 12, and determines that the distance is less than an arbitrary standard, for example, from several meters to more than ten meters. Congestion may be determined as a further condition.

In S204, the server device 10 groups the power supply subject vehicles 12 that are the targets of power supply. The server device 10 groups a plurality of power supply subject vehicles 12 in which the distance between the power supply subject vehicles 12 closest to each other is less than an arbitrary standard, for example, from several meters to more than ten meters or less. Here, there is a high probability that the power supply subject vehicles 12 whose surrounding traffic situation is determined to be congested in S203 will be grouped into the same group. On the other hand, when there is no traffic jam and the distance between the power supply subject vehicles 12 is greater than the reference, one group may be formed by one power supply subject vehicle 12.

In S205, the server device 10 searches for a refueling base near the grouped power supply subject vehicles 12. The vicinity of the grouped power supply subject vehicles 12 is within an arbitrary distance range, for example, within several hundred meters from each power supply subject vehicle 12 included in the group. The refueling base is a replenishment base for fuel used by the power generation device 17 of the power supply vehicle 13 for power generation, and is, for example, a station for replenishing various fuels such as hydrogen for fuel cell. The refueling station may be a gas station for a gasoline power generator. The server device 10 searches for a refueling base using map information.

In S206, the server device 10 acquires location information, battery information, and power generation information from one or more power supply vehicles 13. The server device 10 requests information for each power supply vehicle 13 from one or more power supply vehicles 13, and acquires information sent from each power supply vehicle 13 in response to the request. The battery information includes information on the capacity and remaining amount of the battery 15. The power generation information includes information on the presence or absence of a power generation device, the amount of power that can be generated when the power generation device 17 is included, and the amount of fuel to obtain the amount of power.

In S207, the server device 10 selects a power supply vehicle 13 to perform rush charging for each group of power supply vehicles 12. The server device 10 calculates, for each group, the total amount of electric power (hereinafter referred to as the required amount of electricity) required for charging the batteries 15 of all the power supply subject vehicles 12 included in the group to be equal to or more than any criterion, for example, equal to or more than 80% as to the SOC value. Then, the server device 10 selects the power supply subject vehicle 12 depending on the required amount of power and whether the traffic situation at the point where the group is located is congested.

In the case of a group located at a point where no traffic congestion occurs, the number of power supply subject vehicles 12 included in the group is relatively small, and there is a high probability that the required amount of electric power is relatively small. That is, there is a high probability that the required amount of power can be covered by the power supply from the battery 15 of the power supply subject vehicle 12. Therefore, the server device 10 selects a power supply vehicle 13 whose battery remaining amount exceeds the required amount of power.

In the case of a group located at a point where traffic congestion occurs, there is a relatively large number of power supply subject vehicles 12 included in the group, and there is a high probability that the required amount of power is relatively large. There is a possibility that the power supply from the battery 15 of the power supply subject vehicle 12 cannot cover the required amount of electricity. Therefore, the server device 10 selects a power supply vehicle 13 whose remaining battery level and the amount of power that can be generated exceed the required amount of power. In that case, the condition may be that a refueling base is searched near the group. By doing so, the power supply vehicle 13 can replenish the power generation device 17 with fuel to continuously generate and supply power, and can cover the required amount of power. Furthermore, the server device 10 can select a power supply vehicle 13 that can generate electricity using fuel that can be refilled at a fuel replenishment base. At this time, if a fuel refueling base for fuel cell and a gasoline refueling base compete under the same conditions, the server device 10 selecting the power supply vehicle 13 by giving priority to power generation by fuel cell over power generation by gasoline may be possible. By doing so, it becomes possible to reduce the environmental burden of power generation.

In any case, if a plurality of power supply vehicles 13 having the same conditions compete with each other, the server device 10 selects one power supply vehicle 13 using an arbitrary algorithm. For example, the server device 10 has the largest remaining battery level, or the sum of the remaining battery level and the amount of power that can be generated, among the power supply vehicles 13 located within an arbitrary distance range (for example, several kilometers) from the group's location. A power supply vehicle 13 is selected. Alternatively, the server device 10 may select the power supply vehicle 13 closest to the group position from among the power supply vehicles 13 whose remaining battery level or the total of the remaining battery level and the amount of power that can be generated satisfies the above conditions.

As described above, by selecting the power supply vehicle 13 according to the traffic situation around the group, when the power supply vehicle 13 is allocated to each of a plurality of groups, the power supply vehicle 13 equipped with only the battery 15, It becomes possible to efficiently allocate the power supply vehicle 13 equipped with the battery 15 and the power generation device 17.

In S208, the server device 10 creates a vehicle allocation plan. The vehicle allocation plan includes information specifying the power supply vehicle 13 that performs rush charging for each group, the destination and travel route of the power supply vehicle 13, and information such as the travel start time. The server device 10 sets an arbitrary destination near the group's location for each group. The destination is a point where the power supply subject vehicle 12 and the power supply vehicle 13 can park and stop at the same time to perform power supply, and is a point, such as a parking area, to which the power supply subject vehicle 12 can move. For example, the destination is a point within an arbitrary distance range, for example, several hundred meters, from any of the power supply subject vehicles 12 in the group. Then, the server device 10 uses an arbitrary algorithm to derive a travel route and a travel start time that will allow the selected power supply vehicle 13 to reach its destination.

In S209, the server device 10 sends a movement instruction to the selected power supply vehicle 13. The movement instruction includes information on the movement route to the destination and a movement start time.

In S210, the server device 10 sends vehicle allocation confirmation information to the power supply subject vehicles 12 of each group. The vehicle allocation confirmation information includes information such as the destination of the power supply vehicle 13, that is, the point where power feeding is performed, and the expected arrival time of the power supply vehicle 13. The expected arrival time is derived from the position of the power supply vehicle 13 and the distance of the route. By notifying the user of each power supply subject vehicle 12 with such information, the user can move the power supply subject vehicle 12 to the destination. Alternatively, the power supply subject vehicle 12 can move toward the destination by automatic driving.

In S211, the power supply vehicle 13 is dispatched in response to the movement instruction. When the movement start time comes, the power supply vehicle 13 starts moving automatically according to the movement route. Alternatively, the power supply vehicle 13 displays the travel route to the occupant, and starts moving in response to the occupant's operation.

When the power supply vehicle 13 arrives at the destination, power is sequentially supplied from the power supply vehicle 13 to one or more power supply subject vehicles 12 in S212. For example, the power supply vehicle 13 transfers the power for power supply from the battery 15 or the power for power supply from the battery 15 and the power generated by the power generation device 17 to the battery 15 of the power supply subject vehicle 12 through the operation of a passenger or the operation of an automatic machine to charge.

As described above, in the case of traffic congestion, the power supply vehicle 13, which is equipped with the power generation device 17 in addition to the battery 15 and has a higher power generation capacity than the case of only the battery 15, is charged. It becomes possible to more reliably cover the necessary amount of power supply. Therefore, it is possible to improve the reliability of power supply by the power supply vehicle.

Although the embodiment has been described above based on the drawings and examples, it should be noted that those skilled in the art can easily make various modifications and alterations thereto based on the present disclosure. It should be noted, therefore, that these modifications and alterations are within the scope of the present disclosure. For example, the functions included in each means, each step, etc. can be rearranged so as not to be logically inconsistent, and a plurality of means, steps, etc. can be combined into one or divided.

What is claimed is:

1. A server device comprising:

a communication unit; and a control unit that performs communication using the communication unit, wherein:

the control unit sends a movement instruction to a first power supply vehicle to move to a position of a power supply subject vehicle that requires power supply when a traffic situation around the power supply subject vehicle is a first situation; and the control unit sends a movement instruction to a second power supply vehicle to move to the position of the power supply subject vehicle when the traffic situation is a second situation in which a degree of congestion is higher than the first situation, the second power supply vehicle having a higher power generation capacity than the first power supply vehicle, wherein the first power supply vehicle is equipped with only a battery, the second power supply vehicle is equipped with a battery and a power generation device, and the second power supply vehicle uses fuel to generate electricity with the power generation device.

2. The server device according to claim 1, wherein the control unit sends the movement instruction to the first or second power supply vehicle capable of supplying an amount of power to bring a remaining battery amount of the power supply subject vehicle to a predetermined amount.

3. The server device according to claim 2, wherein the control unit selects the second power supply vehicle on condition that there is a replenishment base for fuel to be used for power generation near the power supply subject vehicle.

4. The server device according to claim 3, wherein the control unit selects the second power supply vehicle according to a type of the fuel.

5. The server device according to claim 3, wherein the control unit groups a plurality of the power supply subject vehicles that are power supply targets in which a distance between power supply subject vehicles in the plurality of the power supply subject vehicles closest to each other is from several meters to more than ten meters or less, and the control unit searches for the replenishment base within a range of several hundred meters from at least one power-supply-subject vehicle included in the group.

6. The server device according to claim 3, wherein the replenishment base comprises at least one of a hydrogen station for a fuel cell and a gasoline station for a gasoline power generator for fuel used by the power generation device.

7. The server device according to claim 6, wherein the control unit prioritizes selection of a power supply vehicle that generates power using hydrogen fuel cell over gasoline to reduce environmental burden.

8. The server device according to claim 2, wherein the predetermined amount corresponds to a state-of-charge threshold equal to or greater than 80%.

9. The server device according to claim 1, wherein the control unit determines the traffic situation based on a moving speed derived from a change in position over time and a distance between nearest power-supply-subject vehicles.

10. The server device according to claim 9, wherein the control unit periodically acquires the position of the power-supply-subject vehicles at a period of several seconds to more than ten seconds to derive the moving speed.

11. The server device according to claim 1, wherein, when the traffic situation is the second situation, the control unit selects, as the second power supply vehicle, a vehicle in which a remaining battery amount and an amount of power that can be generated exceeds a required amount of electricity.

12. The server device according to claim 11, wherein, when the traffic situation is not congested, the control unit selects the first power supply vehicle whose remaining battery amount exceeds the required amount of electricity.

13. The server device according to claim 1, wherein, when the traffic situation is not congested, the control unit selects the first power supply vehicle whose remaining battery amount exceeds the required amount of electricity.

* * * * *